(12) United States Patent
Deshpande et al.

(10) Patent No.: US 10,228,859 B2
(45) Date of Patent: Mar. 12, 2019

(54) EFFICIENCY IN ACTIVE MEMORY SHARING

(71) Applicant: International Business Machines Corporation, Armonk, NY (US)

(72) Inventors: Kshamatha Deshpande, Bangalore (IN); Monica J. Lemay, Cedar Park, TX (US); Yogesh G. Patgar, Bangalore (IN); Girish Shrigiri, Gulbarga (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/221,807

(22) Filed: Jul. 28, 2016

(65) Prior Publication Data

US 2018/0032250 A1  Feb. 1, 2018

(51) Int. Cl.
| | |
|---|---|
| G06F 12/00 | (2006.01) |
| G06F 3/06 | (2006.01) |
| G06F 12/122 | (2016.01) |
| G06F 13/16 | (2006.01) |
| G06F 9/50 | (2006.01) |
| G06F 9/455 | (2018.01) |

(52) U.S. Cl.
CPC ............ *G06F 3/061* (2013.01); *G06F 3/0604* (2013.01); *G06F 3/065* (2013.01); *G06F 3/067* (2013.01); *G06F 3/068* (2013.01); *G06F 3/0608* (2013.01); *G06F 3/0617* (2013.01); *G06F 3/0619* (2013.01); *G06F 3/0641* (2013.01); *G06F 3/0647* (2013.01); *G06F 9/45533* (2013.01); *G06F 9/5077* (2013.01); *G06F 12/122* (2013.01); *G06F 13/1663* (2013.01); *G06F 2212/69* (2013.01)

(58) Field of Classification Search
None
See application file for complete search history.

(56) References Cited

U.S. PATENT DOCUMENTS

| 8,402,228 B2 | 3/2013 | Anand et al. |
| 8,607,020 B2 | 12/2013 | Jacobs et al. |
| 8,972,648 B2 | 3/2015 | Kumar et al. |

(Continued)

OTHER PUBLICATIONS

Disclosed Anonymously, "Cooperative Active Memory Sharing Across OS's in a Virtualized Environment" IP.com No. IPCOM000219099D, Publication Date: Jun. 19, 2012; 3 pages.

*Primary Examiner* — Midys Rojas
(74) *Attorney, Agent, or Firm* — Cantor Colburn LLP; Jason Sosa

(57) ABSTRACT

An aspect includes a method for sharing memory in a computer system that includes receiving a request, from a logical partition (LPAR) executing on a processor, for a page in a shared physical memory to be moved into a logical page of a logical memory of the LPAR. It is determined, by the hypervisor, that the page is physically located in a hypervisor paging device. It is determined whether the request is from a paging process executing at the LPAR to migrate the logical page to a local paging device to make room for an other logical page in the logical memory. Based on determining that the request is from the paging process, the logical page is marked to indicate that the physical page is on the hypervisor paging device and a new logical page is added to the logical memory for the other logical page.

20 Claims, 4 Drawing Sheets

(56) References Cited

U.S. PATENT DOCUMENTS

2006/0117130 A1 6/2006 Tsushima et al.
2006/0248528 A1 11/2006 Oney et al.
2010/0250883 A1 9/2010 Oshida
2017/0147224 A1* 5/2017 Kumar .................. G06F 3/0608

* cited by examiner

EFFICIENCY IN ACTIVE MEMORY SHARING

BACKGROUND

The present invention relates to computer memory systems, and more specifically, to improved efficiency in systems that support active memory sharing (AMS).

Virtualization is the creation of substitutes for real computer resources, that is, substitutes that have the same functions and external interfaces as their counterparts, but that differ in attributes, such as size, performance, and cost. These substitutes are called virtual resources, and their users are typically unaware of the substitution. Virtualization is commonly applied to physical hardware resources by combining multiple physical resources into shared pools from which users receive virtual resources. With virtualization, one physical resource can look like multiple resources. Virtualization of resources such as servers, storage, and networks can be used to create an on demand, secure, and flexible computing infrastructure.

System virtualization creates many virtual systems within a single physical system. Virtual systems are independent operating environments that use virtual resources. System virtualization can be approached through hardware partitioning or hypervisor technology. Hardware partitioning subdivides a physical server into fractions, each of which can run an operating system. These fractions are typically created with coarse units of allocation, such as whole processors or physical boards. This type of virtualization allows for hardware consolidation, but does not have the full benefits of resource sharing and emulation offered by hypervisors. Hypervisors use a thin layer of code in software or firmware to achieve fine-grained, dynamic resource sharing. Because hypervisors provide the greatest level of flexibility in how virtual resources are defined and managed, they are the primary technology for system virtualization.

Shared memory is physical memory that is assigned to a shared memory pool and shared among multiple logical partitions (LPARs). The shared memory pool is a defined collection of physical memory blocks that are managed as a single memory pool by the hypervisor. LPARs that are configured to use the shared memory pool are referred to as "shared memory partitions" and they share the memory in the pool with other shared memory LPARs.

SUMMARY

Embodiments include a method, system, and computer program product for sharing memory in a computer system. The method includes receiving a request, from a logical partition (LPAR) executing on a processor, for a page in a physical memory to be moved into a logical page of a logical memory of the LPAR. The request is received at a hypervisor executing on the processor and the LPAR is one of a plurality of LPARs sharing the physical memory. It is determined, by the hypervisor, that the page is physically located in a hypervisor paging device. It is determined whether the request is from a paging process executing at the LPAR to migrate the logical page to a local paging device to make room for an other logical page in the logical memory. Based on determining that the request is from a paging process executing at the LPAR to migrate the logical page to a local paging device, the logical page is marked to indicate that the physical page is on the hypervisor paging device and a new logical page is added to the logical memory for the other logical page. Based on determining that the request is not from a paging process executing at the LPAR to migrate the logical page to a local paging device, the page is copied from the hypervisor paging device to the physical memory and the logical page is updated in the logical memory to correspond to the page in the physical memory.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments described herein can reduce the amount of computing resources that are utilized to perform paging activities in a system that employs active memory sharing (AMS). This reduction can be realized by keeping track of memory pages that have been paged out of real memory to a hypervisor paging device. When a request from an operating system (OS) is received by the hypervisor for a page that has been paged out to the hypervisor paging device, the page is not retrieved from the hypervisor paging device if it is being retrieved by the OS to be paged out to an OS paging device. In this manner, the system avoids retrieving a page from the hypervisor paging device only to have the page be immediately moved, or paged-out, to the OS paging device by a paging process.

A computer system, or server, can host multiple independent OSs, each using a subset of system resources. The OS can run inside of a logical partition (LPAR) that provides access only to the resources configured by the system administrator, such as processors, memory, and input/output (I/O). System resources can be either dedicated to a single LPAR or shared among a subset of LPARs. The choice can depend on several considerations including, but not limited to: performance expectations, global resource optimization, and cost. A single system can be configured with both dedicated and shared resources.

A LPAR has exclusive access to all of its dedicated resources. This setup may offer performance advantages on resource access time, but with a trade-off to resource utilization that highly depends on the LPAR's load. On the server, there may be LPARs with high stress on their dedicated resources and reduced performance, while other LPARs have a very low usage of their resources.

Resource sharing allows multiple LPARs to access the same resource under the control of a hypervisor that monitors load, applies allocation rules, and then time shares the access the resource. The single LPAR treats the shared resource as though it has complete access to it. It is the hypervisor that manages the real access, avoiding conflicts or interferences, and allowing access to those logical partitions that have the highest resource requirements. For example, the Micro-Partitioning® feature of PowerVM® from IBM is widely used to share processors. An administrator can define a pool of physical processors and logical partitions can be created with a set of virtual processor and pool access rules. The system hypervisor assigns physical processors to virtual processors for a period of time that depends on access rules and the load of all logical partitions. The assignment is transparent to the OS that assigns threads to virtual processors as though they were physical processors. The AMS feature of PowerVM allows sharing of system memory. In addition to traditional dedicated memory assignment to single LPARs, the administrator has the choice of creating a memory pool that can be shared among a set of LPARs.

Figure 1:
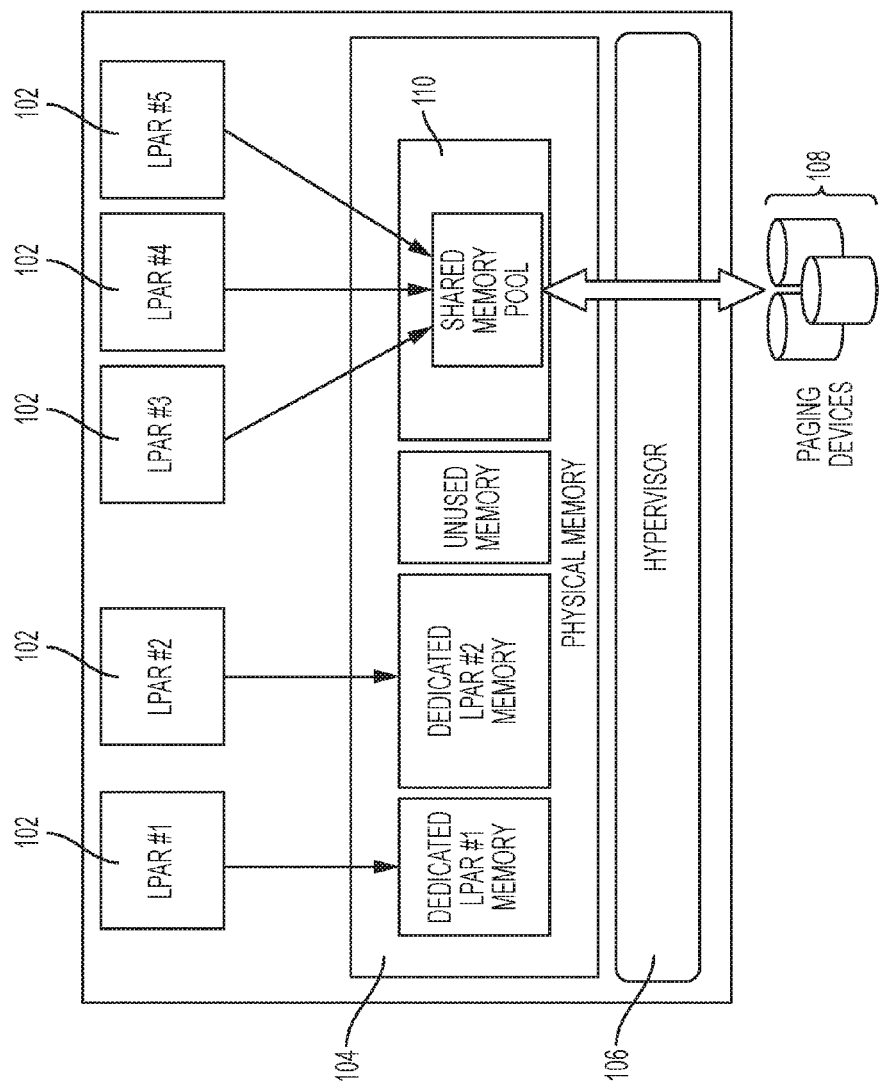
FIG. 1 is a block diagram of a computer system that supports active memory sharing (AMS) according to one or more embodiments.

Referring now to FIG. 1, a block diagram of a system that supports AMS is generally shown in accordance with one or more embodiments. The system shown in FIG. 1 includes LPARs 102, a physical memory 104, a hypervisor 106, and one or more hypervisor paging devices 108. The physical memory 104 shown in FIG. 1 includes dedicated memory (labeled "Dedicated LPAR #1 Memory" and "Dedicated LPAR #2 Memory"), unused memory, and shared memory 110 that includes a shared memory pool. The share memory pool uses the paging devices 108 under control of the hypervisor 106.

As shown in FIG. 1, each LPAR 102 can be configured to have either dedicated or shared memory in the physical memory 104. Dedicated memory LPARs have system memory reserved based on their configuration. Memory size can be a multiple of the system's logical memory block size (e.g., 16, 32, 64, 12.8, or 256 megabytes) and it is all allocated for the LPAR as soon as it is activated. Shared memory LPARs are configured with a logical memory space that is a multiple of the system's logical memory block size, but physical memory 104 is allocated to an LPAR 102 by the hypervisor 106 from the shared memory pool 110 based on the LPAR's runtime memory requirements. Memory allocation can be made with a very fine granularity that depends on the hypervisor's page size (e.g., 4 kilobytes).

AMS allows over-commitment of memory resources. Because logical memory is mapped to physical memory based on the LPARs' 102 memory demand, the sum of all LPARs' 102 logical memory can exceed the shared memory pool size with the use of auxiliary storage devices such as the hypervisor paging devices 108 shown in FIG. 1. Each LPAR 102 is allowed to use all assigned logical memory. When the cumulative usage of physical memory 104 reaches the pool's size, the hypervisor 106 can transparently "steal" memory from a shared memory LPAR 102 and assign it to another shared memory LPAR 102. If the removed memory page contains data, it is stored on the paging device 108 and the memory page content is cleared in the physical memory 104 before it is assigned to another LPAR 102. If the newly assigned page contained data, then it is restored from the paging device 108. Since paging disk activity has a cost in terms of logical memory access time, the hypervisor 106 keeps track of memory usage to steal memory that will likely not be assigned in the near future. The shared LPAR's OS cooperates with the hypervisor 106 by providing hints about page usage and by freeing memory pages to limit hypervisor paging.

In one or more embodiments, the shared memory pool 110 is a collection of physical memory blocks that are managed as a whole by the hypervisor 106. The memory in the shared memory pool 110 is reserved upon creation and it is no longer available for allocation to other dedicated memory LPARs 102. The shared memory pool 110 is directly managed by the hypervisor 106 for exclusive use by shared memory LPARs 102. When the hypervisor 106 needs to free memory pages in the shared memory pool 110, the content of the memory must be stored on a paging device 108 to be restored later when the data is accessed again. This activity is referred to herein as "paging activity."

In one or more embodiments, in order to globally optimize shared memory usage, there is cooperation among the hypervisor 106 and the OSs hosted by each shared LPAR 102. The OS knows the importance of logical memory pages and provides hints on page usage. It tags each logical memory page to indicate how vital it is, allowing the hypervisor 106 to prioritize the pages that have a lower impact on the LPAR's performance. "Loaned pages" refer to pages that are part of a loaning process that allows improved cooperation between the hypervisor 106 and each OS. Instead of performing only page stealing, the hypervisor 106 also requests the OS to free some logical memory pages and the OS can choose which pages are more appropriate to free. By loaning pages, the OS reduces the activity of the hypervisor 106, improving overall performance of the shared memory pool 110.

Figure 2:
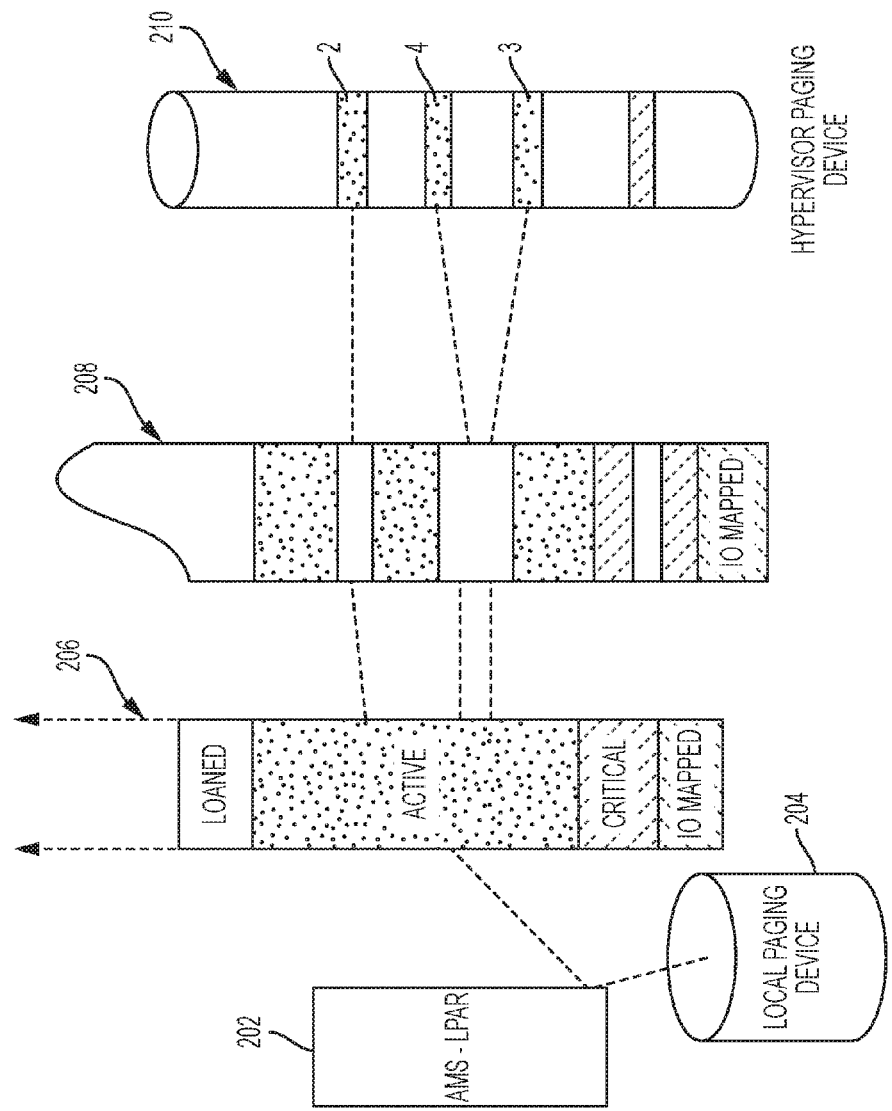
FIG. 2 is a block diagram of logical and physical memory in a computer system the supports AMS according to one or more embodiments.

Referring now to FIG. 2, a block diagram of logical and physical memory in a computer system that supports AMS is generally shown in accordance with one or more embodiments. In the AMS shown in FIG. 2 there are two paging devices, a local paging device 204 at the OS level and a hypervisor paging device 210 at the hypervisor level. Also shown in FIG. 2 is a shared LPAR 202, logical memory 206, and physical memory 208. The logical memory 206 is the address space assigned to the LPAR 202 that the OS perceives as its main storage. For a LPAR 202 that uses shared memory, a subset of the logical memory 206 is backed up by the physical memory 208 and the remaining is kept in auxiliary storage such as the hypervisor paging device 210.

FIG. 2 shows an example of logical to physical mapping made by the hypervisor 106 at a given time. The shared memory LPAR 202 owns the logical memory 206 and provides the classification of page usage (page hints) to the hypervisor 106. The usage of the physical memory 208 is managed exclusively by the hypervisor 106 based on the current memory demand of the entire pool and on how the shared memory LPAR 202 accesses the memory. While I/O mapped pages are always assigned physical memory 208, all other pages may be placed either in physical memory 208 or in one of the paging devices (local paging device 204 and/or hypervisor paging device 210). Free and loaned pages have no content from the shared memory LPAR's 202 point of view, and they don't need to be copied to the paging devices.

In one or more embodiments, the algorithm used by the hypervisor for paging out a few pages from physical memory 208 is a least recently used (LRU) page replacement algorithm. As shown in FIG. 2, when partition page loaning is turned on at the LPAR 202 (e.g., an AIX partition), OS paging activity is primarily used for loading the pages. In one or more embodiments, code executing in the OS (e.g., a collaborative memory manager or "CMM") will hint to code executing in the hypervisor (e.g., an active memory sharing manager or "AMSM") on which pages to be loaned. It is often the case that these hinted (to be loaned) pages are the pages which are to be paged out by the OS to the local paging device 204.

However, there are situations when the OS will try to page out active pages based on a least recently used daemon (LRUD) but those pages may not be present in the physical memory 208 (also referred to as "real memory"). These pages might be on the hypervisor paging device 210. The blocks marked "2" "3" "4" in the hypervisor paging device 210 of FIG. 2 are examples of pages that have been paged out from the physical memory 208 to the hypervisor paging device 210. In this situation, when a paging process on the OS requests these pages, the hypervisor needs to page in those pages, or bring those pages back on to the real memory (the physical memory 208). Then, the OS will page them out to the local paging device 204 and mark them as free pages in the logical memory 206 for loading new pages by the OS. In this scenario, the virtual central processing unit (VCPU) where the LRUD is scheduled will go to sleep until the hypervisor pages the required pages into the physical memory 208. In this example, those pages are required by the OS to only page them out to the local paging device 204. This can cause additional paging activity by the hypervisor, which is demanded by the OS only to push the pages on to a local paging device.

One or more embodiments described herein avoid this type of additional paging activity by having the LRUD mark the page frame in the logical memory 206 with a bit that indicates that the page is present in an auxiliary, or secondary, paging device, shown in FIG. 2 as the hypervisor paging device 210. The bit can be referred to as a secondary paging device persist (SPDP) bit. Marking the logical pages in the logical memory 206 in this manner can result in an increase in the size of the logical memory 206 used by the LPAR 202. In accordance with one or more embodiments, when a logical page is marked with the SPDP bit, a new logical page is added to the logical memory 206 as a free page and the size of the logical memory 206 is increased. This resulting larger size of the logical memory 206 will never be more than twice the number of logical addresses utilized by the LPAR 202. If the LPAR 202 is allocated with "X" gigabytes of logical memory, the size of the logical memory 206 utilized by the LPAR 202 can be increased up to "2x." That is because at the maximum, only up to "X" gigabytes of pages marked with a SPDP bit which indicates that the page is paged out to the hypervisor paging device 210.

In one or more embodiments, when memory is allocated to the LPAR 202, the LPAR 202 always boots up with "2x" gigabytes of logical memory 206, however the LPAR is restricted (e.g., by a virtual machine manager or "VMM") to using only "X" gigabytes of the logical memory 206 at one time.

In one or more embodiments, when the LRUD steals the pages to page them out onto the local paging device 204, a CMM will interact with an AMSM to know exactly where those pages reside. If the page resides in the hypervisor paging device 210, then those pages will be marked with the SSDP bit. After this activity, the LRUD will either request the CMM to increase the logical memory page frame and the local page table or add those pages as loaned pages. Thus, when these pages are referenced again either by an application or by the LRUD for page replacement, these pages are brought back into real memory (e.g., physical memory 208) with only one page-in activity at the hypervisor.

Figure 3:
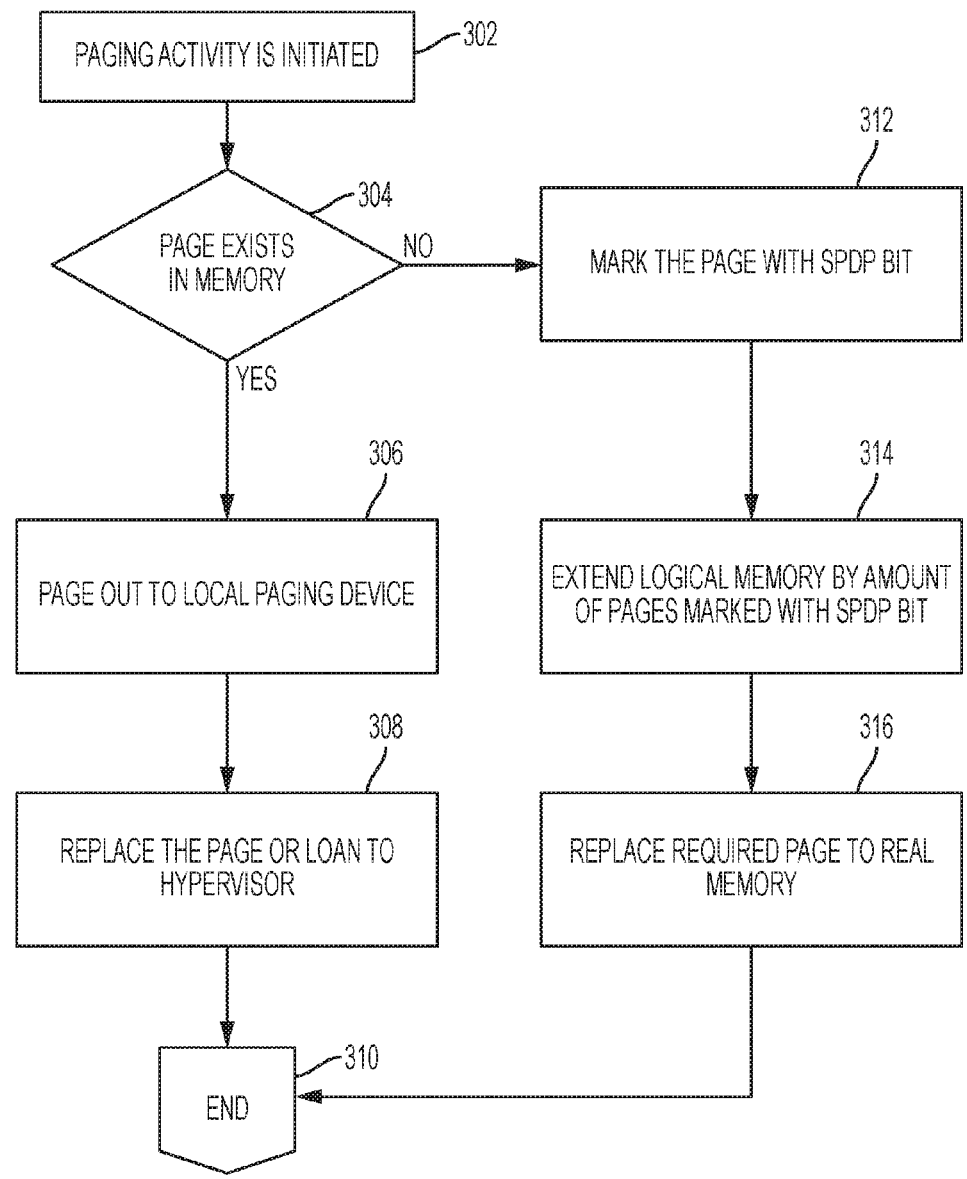
FIG. 3 is a process flow of performing memory management in a computer system that supports AMS according to one or more embodiments.

Referring now to FIG. 3, a process flow of performing memory management in a system that supports AMS is generally shown in accordance with one or more embodiments. In one or more embodiments, the process flow shown in FIG. 3 is performed by a hypervisor and/or an OS executing in a LPAR. Paging activity is initiated (e.g., by a LRUD) at block 302 of FIG. 3, and at block 304 it is determined whether a requested page exists in physical memory. If it is determined at block 304 that the requested page does exist in the physical memory, then block 306 is performed and the requested page is paged out to a local paging device, and at block 308 the page that was paged out is replaced or loaned to the hypervisor. Processing completes at block 310. If it is determined at block 304 that the requested page does not exist in the physical memory, then block 312 is performed and the requested page is marked in the logical memory with a SPDP bit. Processing continues at block 314 where the logical memory is extended by the amount of pages marked with the SPDP bit, and at block 316 the requested page is replaced in the physical memory. Processing completes at block 310.

Figure 4:
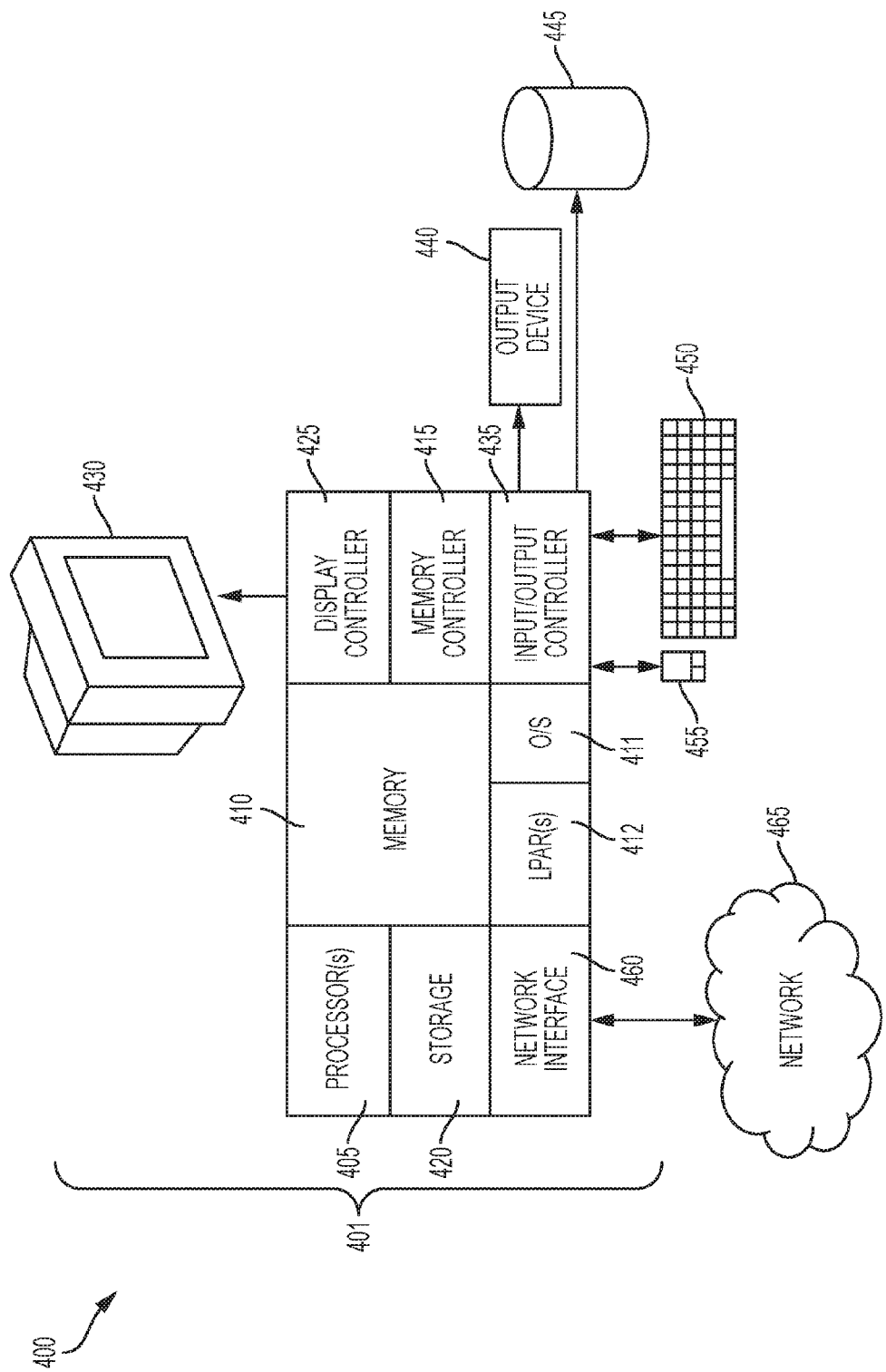
FIG. 4 illustrates a computer system according to one or more embodiments of the invention.

Referring now to FIG. 4, a block diagram of a virtual computer system 400 is generally shown in accordance with one or more embodiments. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 400 therefore may include a general-purpose computer or mainframe 401 capable of running multiple instances of an O/S simultaneously.

In an exemplary embodiment, in terms of hardware architecture, as shown in FIG. 4, the computer 401 includes one or more processors 405, memory 410 coupled to a memory controller 415, and one or more input and/or output (I/O) devices 440, 445 (or peripherals) that are communicatively coupled via a local input/output controller 435. The input/output controller 435 can be, for example but not limited to, one or more buses or other wired or wireless connections, as is known in the art. The input/output controller 435 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 435 may include a plurality of sub-channels configured to access the output devices 440 and 445. The sub-channels may include fiber-optic communications ports.

The processor 405 is a hardware device for executing software, particularly that stored in storage 420, such as cache storage, or memory 410. The processor 405 can be any custom made or commercially available processor, a central processing unit (CPU), an auxiliary processor among several processors associated with the computer 401, a semiconductor based microprocessor (in the form of a microchip or chip set), a macroprocessor, or generally any device for executing instructions.

The memory 410 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, and/or other types of storage media. Note that the memory 410 can have a distributed architecture, where various components are situated remote from one another, but can be accessed by the processor 405.

The instructions in memory 410 may include one or more separate programs, each of which comprises an ordered listing of executable instructions for implementing logical functions. In the example of FIG. 4, the instructions in the memory 410 a suitable operating system (OS) 411. The operating system 411 essentially controls the execution of other computer programs and provides scheduling, input-output control, file and data management, memory management, and communication control and related services.

The memory 410 may include multiple logical partitions (LPARs) 412, each running an instance of an operating system. The LPARs 412 may be managed by a hypervisor, which may be a program stored in memory 410 and executed by the processor 405.

In an exemplary embodiment, a conventional keyboard 450 and mouse 455 can be coupled to the input/output controller 435. Other output devices such as the I/O devices 440, 445 may include input devices, for example but not limited to a printer, a scanner, microphone, and the like. Finally, the I/O devices 440, 445 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 400 can further include a display controller 425 coupled to a display 430. In an exemplary embodiment, the system 400 can further include a network interface 460 for coupling to a network 465. The network 465 can be an IP-based network for communication between the computer 401 and any external server, client and the like via a broadband connection. The network 465 transmits and receives data between the computer 401 and external systems. In an exemplary embodiment, network 465 can be a managed IP network administered by a service provider. The network 465 may be implemented in a wireless fashion, e.g., using wireless protocols and technologies, such as WiFi, WiMax, etc. The network 465 can also be a packet-switched network such as a local area network, wide area network, metropolitan area network, Internet network, or other similar type of network environment. The network 465 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 401 is a PC, workstation, intelligent device or the like, the instructions in the memory 410 may further include a basic input output system (BIOS) (omitted for simplicity). The BIOS is a set of essential software routines that initialize and test hardware at startup, start the OS 411, and support the transfer of data among the hardware devices. The BIOS is stored in ROM so that the BIOS can be executed when the computer 401 is activated.

When the computer 401 is in operation, the processor 405 is configured to execute instructions stored within the memory 410, to communicate data to and from the memory 410, and to generally control operations of the computer 401 pursuant to the instructions.

In an exemplary embodiment, the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for sharing memory in a computer system, the method comprising:

receiving a request, from a logical partition (LPAR) executing on a processor, for a page in a physical memory to be moved into a logical page of a logical memory of the LPAR, the request received at a hypervisor executing on the processor and the LPAR one of a plurality of LPARs sharing the physical memory;

determining, by the hypervisor, that the page is physically located in a hypervisor paging device;

determining whether the request is from a paging process executing at the LPAR to migrate the logical page to a local paging device to make room for an other logical page in the logical memory;

based on determining that the request is from a paging process executing at the LPAR to migrate the logical page to a local paging device:

marking the logical page in the logical memory to indicate that the physical page is in the hypervisor paging device and not moving the physical page into the logical page of the logical memory; and adding a new logical page to the logical memory for the other logical page; and based on determining that the request is not from a paging process executing at the LPAR to migrate the logical page to a local paging device:
  copying the page from the hypervisor paging device to the physical memory; and
  updating the logical page in the logical memory to correspond to the page in the physical memory.

2. The method of claim 1, wherein the paging process includes a least recently used (LRU) algorithm.

3. The method of claim 2, wherein the LRU algorithm is implemented by a daemon.

4. The method of claim 1, wherein the logical memory of the LPAR in initialized to include twice as many logical pages that are estimated to be utilized at any given time by the LPAR.

5. The method of claim 1, wherein the new logical page is a page that was loaned, at a time previous to receiving the request, to the hypervisor by the LPAR.

6. The method of claim 1, wherein the marking includes setting a secondary paging device persist bit in the logical page in the logical memory.

7. The method of claim 1, further comprising:
receiving a second request, from the LPAR for the page in the physical memory to be moved into the logical page of the LPAR;
determining, by the hypervisor, based on the marking, that the page is physically located in the hypervisor paging device;
determining that the second request is not from a paging process executing at the LPAR;
copying the page from the hypervisor paging device to the physical memory; and
updating the logical page in the logical memory to correspond to the page in the physical memory.

8. A system for sharing memory, the system comprising:
a shared physical memory; and
a processor, the processor configured for:
  receiving a request, from a logical partition (LPAR) executing on a processor, for a page in the physical memory to be moved into a logical page of a logical memory of the LPAR, the request received at a hypervisor executing on the processor and the LPAR one of a plurality of LPARs sharing the physical memory;
  determining, by the hypervisor, that the page is physically located in a hypervisor paging device;
  determining whether the request is from a paging process executing at the LPAR to migrate the logical page to a local paging device to make room for an other logical page in the logical memory;
  based on determining that the request is from a paging process executing at the LPAR to migrate the logical page to a local paging device:
    marking the logical page in the logical memory to indicate that the physical page is in the hypervisor paging device and not moving the physical page into the logical page of the logical memory; and
    adding a new logical page to the logical memory for the other logical page; and
  based on determining that the request is not from a paging process executing at the LPAR to migrate the logical page to a local paging device:
    copying the page from the hypervisor paging device to the physical memory; and
    updating the logical page in the logical memory to correspond to the page in the physical memory.

9. The system of claim 8, wherein the paging process includes a least recently used (LRU) algorithm.

10. The system of claim 9, wherein the LRU algorithm is implemented by a daemon.

11. The system of claim 8, wherein the logical memory of the LPAR in initialized to include twice as many logical pages that are estimated to be utilized at any given time by the LPAR.

12. The system of claim 8, wherein the new logical page is a page that was loaned, at a time previous to receiving the request, to the hypervisor by the LPAR.

13. The system of claim 8, wherein the marking includes setting a secondary paging device persist bit in the logical page in the logical memory.

14. The system of claim 8, wherein the processor is further configured for:
receiving a second request, from the LPAR for the page in the physical memory to be moved into the logical page of the LPAR;
determining, by the hypervisor, based on the marking, that the page is physically located in the hypervisor paging device;
determining that the second request is not from a paging process executing at the LPAR;
copying the page from the hypervisor paging device to the physical memory; and
updating the logical page in the logical memory to correspond to the page in the physical memory.

15. A computer program product for sharing memory, the computer program product comprising a computer readable storage medium having program instructions embodied therewith, the program instructions executable by processing circuitry to cause the processing circuitry to:
receive a request, from a logical partition (LPAR) executing on a processor, for a page in a physical memory to be moved into a logical page of a logical memory of the LPAR, the request received at a hypervisor executing on the processor and the LPAR one of a plurality of LPARs sharing the physical memory;
determine, by the hypervisor, that the page is physically located in a hypervisor paging device;
determine whether the request is from a paging process executing at the LPAR to migrate the logical page to a local paging device to make room for an other logical page in the logical memory;
based on determining that the request is from a paging process executing at the LPAR to migrate the logical page to a local paging device:
  mark the logical page in the logical memory to indicate that the physical page is in the hypervisor paging device and not moving the physical page into the logical page of the logical memory; and
  add a new logical page to the logical memory for the other logical page; and
based on determining that the request is not from a paging process executing at the LPAR to migrate the logical page to a local paging device:
  copy the page from the hypervisor paging device to the physical memory; and
  update the logical page in the logical memory to correspond to the page in the physical memory.

16. The computer program product of claim 15, wherein the paging process includes a least recently used (LRU) algorithm.

17. The computer program product of claim 16, wherein the LRU algorithm is implemented by a daemon.

18. The computer program product of claim 15, wherein the logical memory of the LPAR in initialized to include twice as many logical pages that are estimated to be utilized at any given time by the LPAR.

19. The computer program product of claim 15, wherein the new logical page is a page that was loaned, at a time previous to receiving the request, to the hypervisor by the LPAR.

20. The computer program product of claim 15, wherein the marking includes setting a secondary paging device persist bit in the logical page in the logical memory.

* * * * *